March 11, 1958  B. R. HARRISON  2,825,993
EXPENDABLE SINKER RELEASE
Filed Sept. 21, 1956
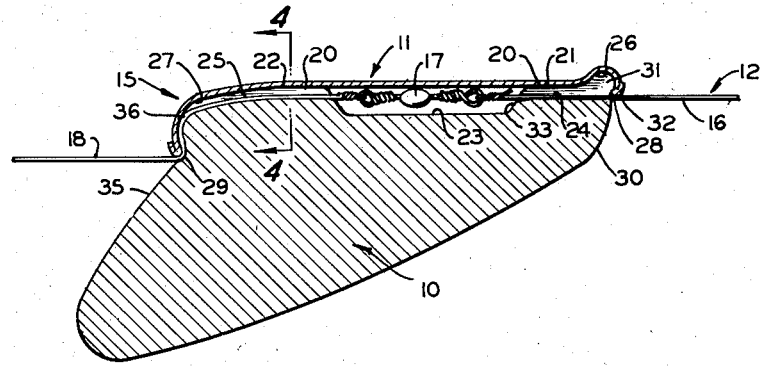
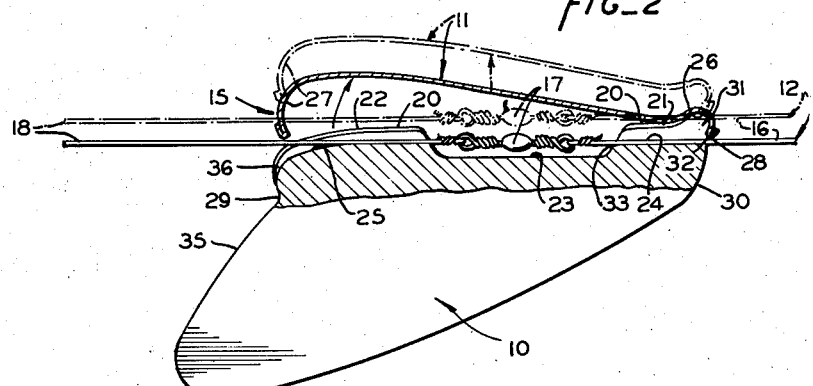
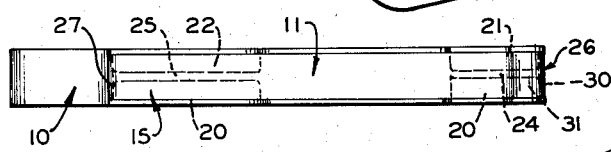
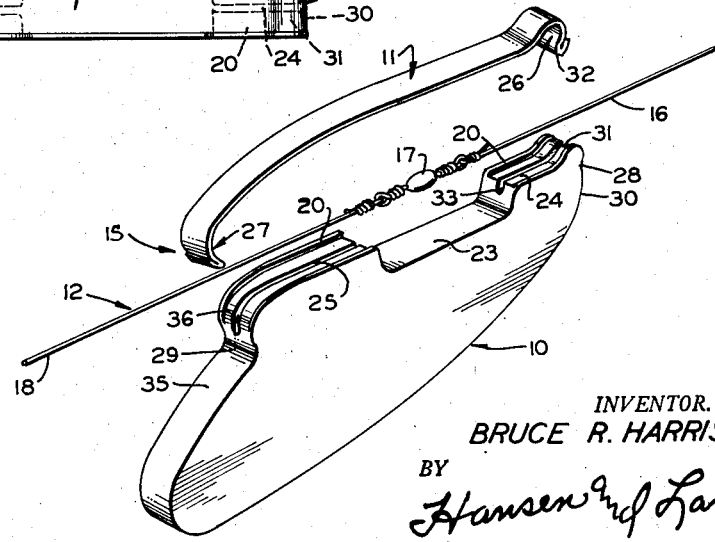
INVENTOR.
BRUCE R. HARRISON
BY
HIS ATTORNEYS

United States Patent Office 2,825,993
Patented Mar. 11, 1958

2,825,993

EXPENDABLE SINKER RELEASE

Bruce R. Harrison, San Jose, Calif.

Application September 21, 1956, Serial No. 611,104

8 Claims. (Cl. 43—43.12)

This invention relates to fishing gear and more particularly to release mechanism for expendable sinkers and the like.

There have been many release mechanisms in fishing gear with the same ultimate purpose and result in mind. In most cases the release mechanism as such has not been expendable although a lead weight or sinker, as they are called, has been sacrificed once it has served its purpose. It will therefore be appreciated that in devices heretofore proposed the release means or mechanism, as such, has been secured to the line and usually between the leader and main section thereof. This has been found objectionable for several reasons. In the first place it is a weighty element and therefore deters the normal flexibility and action of the fish line and leader. Secondly, when it is considered that the leader is often so long as to be reeled all the way up to the tip of the fish pole it will be appreciated that any rigid element thereon such as a release mechanism cannot pass through the grommets on the pole. As a result of this latter situation the fisherman must pull in by hand the last or leader length of his line.

With the release for expendable sinker embodying the present invention the foregoing objections are completely overcome.

It is one object of this invention to provide a release for expendable sinkers which is itself expendable.

It is another object to provide an expendable sinker and release therefor adapted for connection to a fish-line in such a manner as to be released therefrom when the line becomes tense.

These and other objects and advantages of the present invention will become apparent in the following description when read in the light of the drawing in which:

Fig. 1 is a longitudinal section through a sinker and release therefor embodying the present invention.

Fig. 2 is a view similar to Fig. 1 showing the sinker partially released from a fish line.

Fig. 3 is a plan view of Fig. 1 as seen from above.

Fig. 4 is a fragmentary cross section of Fig. 1 taken substantially along line 4—4 thereof.

Fig. 5 is an exploded perspective view of the present invention as it appears when totally released from a fish line.

In the drawing 10 is a weight or sinker which is expendable. 11 is a spring clip which is also expendable, and 12 is a fish line adapted to be secured to the sinker by means of the spring clip 11 as best seen in Figs. 1 and 4.

The invention herein is embodied in a release mechanism 15 for releasing the sinker and clip from the fish line as soon as the latter becomes tensed by reason of a fish being caught on the hook at one end thereof.

As illustrated in the drawing the fish line 12 consists of the usual nylon, silk or cotton thread 16 of conventional kind attached to one end of a swivel connector 17, the opposite end of which is secured to one end of leader 18. The leader usually extends several feet and sometimes a considerable distance further from its point of connection to the fish line and has a hook (not shown) of proper size and gauge attached to its free end. In a trawl line a weight must be conected to the line somewhere between the hook and the pole so as to maintain the leader 18 at a depth considered desirable for catching a particular kind of fish such as salmon.

In the present invention the weight or sinker 10 is secured to the fish line 12 at the swivel connection 17 between the actual line 16 and the leader 18. In accordance with the present invention the sinker 10 which may be of any shape or design is preferably flat at least along and adjacent its upper edge 20. The edge 20 is straight and the weight itself extends downwardly therefrom keel fashion to cut through the water during trawling of the line so as to guide the main portion 16 thereof in a relatively straight line behind the boat or craft aboard which the fisherman is riding.

The straight upper edge 20 of the sinker is provided with a pair of fore and aft lands or tables 21 and 22, respectively, divided by a gap or recess 23 formed substantially midway the ends of the upper edge and into the body of the sinker 10. These lands 21 and 22 are each provided with a groove 24 and 25, respectively, which are aligned with each other to receive the fish line 12 so that the latter is free within these grooves. As best illustrated in Fig. 1 the line extends across the top of the sinker 10 with the swivel connector 17 disposed in the gap or recess 23, the leader 18 in the groove 25 on the back land 22 and the main portion 16 of the line 12 in the groove 24 on the front land 21.

As previously stated the spring clip 11 is adapted to cooperate with a portion of the sinker to secure the same to the line 12. To this end the spring clip 11 is provided with hook-like ends 26 and 27 while the fore and aft ends of the sinker are provided with recesses 28 and 29 adjacent its straight upper edge 20 for receiving the hook-like ends 26 ad 27, respectively, of the spring clip.

More specifically the recess 28 at the fore end of the sinker 10 is formed in the leading edge 30 of the sinker slightly below the plane of the uper edge 20 and terminates substantially at the level of the groove 24 in the front land 21. It will therefore be noted that a nose portion 31 is formed at the foremost end of the upper edge 20 where it meets with the leading edge 30 of the sinker.

Complementary to the shape of the nose 31 and recess 28 as just described, the hook-like end 26 of the spring clip 11 is bent downwardly to fit snugly and firmly over the nose portion 31. In addition thereto the extreme fore end of the spring clip is bent upwardly and back upon itself to provide a rounded surface 32 adapted to hold the main portion of the line beneath it firmly down upon the floor of the groove 24 where it opens up onto the leading edge 30 of the sinker. In this connection note that the front eye of the swivel connector 17 in most cases will bear against the front margin 33 of the recess 23 so that the line 16 is secured to the front land so as to pull the sinker 10 along behind the main portion of the fish line which extends down from the fish pole.

The recess 29 at the aft end of the sinker 10 is formed in the trailing edge 35 thereof a substantial distance beneath the level of the groove 25 formed in the back land 22. However, it should here be noted that the groove 25 curves downwardly at its aft end so that the leader disposed therein emanates therefrom on a curve corresponding to the shape of the recess 29. This rear recess 29 is not so much a notch as it is a seat for the bent rear end 27 of the clip 11. The clip 11 is held in place upon the sinker by reason of its own resiliency or tendency to assume a slight bow between the hook-like ends 26 and 27. Thus it will be seen that when the fore hook-like end 26 is placed in the recess 28 it will articulate relative thereto with a hinge-like action. Now when the spring clip is forced down upon the straight upper edge 20 the aft hook-like end rides over the hump 36 formed at the point of convergence of the upper edge 20 and the trailing edge 35 of the sinker. The hook-like aft end 27 of the spring clip 11 thus seats into the recess 29 and its rounded edge 38 bears down upon the leader 18 so that it emanates from the groove 25 in the aft land 22 along a curve downwardly and rearwardly from the level of this aft groove.

As illustrated in Fig. 4 the lands 21 and 22 can be provided with a seat for the spring clip. In other words, portions of the sinker 10 may guard the sides of the spring clip to prevent accidental snagging thereof and removal of the clip from the sinker 10.

As thus explained, the sinker 10 is secured to the fish line 12 in a manner to allow the leader to trail loosely along behind while the main portion 16 of the line is relatively taut between the fish pole and sinker. However, when a fish is caught on the hook at the free end of the leader 18 that portion of the fish line becomes taut and tends to straighten out relative to that portion of the leader and line within the grooves 24 and 25. When this occurs the rearmost hook-like end 27 of the spring clip is unseated relative to the recess 29 in the trailing edge 35 of the sinker as illustrated in Fig. 2 whereupon the spring clip due to its own resiliency bows up and swings away from the straight upper edge 20 of the sinker about the hinge-like connection between the hooked fore end 26 of the clip and the recess 28 on the leading edge 30 of the sinker.

Ultimately the fish line 12 straightens out as seen in perspective in Fig. 5 so that the spring clip becomes completely disconnected from the sinker as the latter falls away from the line 12. Thereafter the fisherman has a fish caught on the hook with a free and unobstructed fishline between the fish and the end of the fish pole. As a result of this freedom of line the fishline can be reeled in all the way. That is to say, the leader portion 18 as well as the main portion 16 of the fishline will pass through the grommet on the fish pole and can be wound upon the reel without any obstruction or binding thereof.

While I have described my release for expendable sinkers in specific detail it will be appreciated that it is susceptible to variations, alterations and/or modifications without departing from the spirit of my invention. I, therefore, desire to avail myself of all variations, alterations, and/or modifications as fairly come within the purview of the appended claims.

What I claim as new and desire to protect by Letters Patent is:

1. In combination with an expendable sinker adapted to be secured to a fishline, a release mechanism comprising a sinker body having a recess formed on its leading edge adjacent its upper edge, a spring clip having a hooked fore end adapted to be disposed in said recess so as to overlie a portion of said fishline so that the trailing end of the latter extends along the upper edge of said sinker body, said sinker body having an aft recess formed in the trailing edge thereof a substantial distance below the upper edge thereof, and a hook-like end on the aft end of said spring clip adapted to be seated in said aft recess and to hold the trailing end of said fish line in said aft recess in such a manner as to unseat said spring clip relative to said aft recess when said fishline is tautened.

2. A release mechanism for an expendable sinker comprising a weight having a substantially straight upper edge provided with a groove to receive a fishline, a spring clip having a hooked fore end and a hook-like aft end and a bowed mid portion between them tending to dispose said hooked and hook-like ends under the curved ends of said clip, said weight having a notch formed in its leading edge to the level of said groove to afford hinge-like engagement of the hooked end of said clip with said weight and to bear against the fishline where it extends forwardly therefrom, and said weight having a recess formed in its trailing edge to a level below said groove affording slip fit seating of the hook-like end of said clip into said recess and to bend the fishline downwardly thereat whereby to unseat said hook-like end of the clip from said recess when the trailing end of said fishline becomes tensed.

3. A release mechanism for an expendable sinker comprising a weight having a straight upper edge providing fore and aft lands divided by a recess formed between them in said edge, said weight having a groove formed in each of said lands in alignment with each other to receive a fishline, said weight having a notch formed in its leading edge at the level of the groove formed in said fore land, a spring clip having a hooked fore end adapted to engage in said notch to bear upon the fishline, said weight having a recess formed in its trailing edge just below the level of the groove formed in the aft land thereof, and a hook-like bend on the aft end of said spring clip adapted to seat in said recess when said clip is pressed against the upper edge of said weight.

4. A release mechanism for an expendable sinker comprising a weight having an upper portion which is relatively flat on each side and provided with a straight upper surface divided into fore and aft lands separated by a recess formed therebetween, said weight having a groove formed in each of said lands to receive a fishline, said weight having a notch formed in its leading edge above the level of the groove in said fore land thereof to provide a nose portion at the juncture of said upper surface with said leading edge, a spring clip having a hooked fore end adapted to engage in said notch to bear upon the fishline where it extends forwardly from said weight, said weight having a recess formed in its trailing edge at a level below that of the groove in said aft land so that the fishline extending rearwardly therefrom curves downwardly over the trailing edge of said weight as said fishline emanates from the groove in the aft land, and a hook-like aft end on said spring clip having slip fit seating in the recess formed in said trailing edge to bear down upon that portion of the fishline therebeneath and adapted to be unseated by the latter when it becomes tensed.

5. A release mechanism for an expendable sinker comprising a weight having a substantially straight upper edge provided with a fore to aft groove to receive a fishline, a spring slip having a hooked fore end and a hook-like aft end and a bowed mid portion between them tending to dispose said hooked and hook-like ends under the curved ends of said clip, said weight having a notch formed in its fore edge to the level of said groove to afford hinge-like engagement of the hooked end of said clip with said weight and to bear against the fishline where it extends forwardly therefrom, and said weight having a recess formed in its aft edge of said weight to a level below said groove affording slip fit seating of the hook-like end of said clip into said recess when the clip is pressed down against the straight edge of said weight, said groove declining in the region of the recess on the aft edge of said weight to bend the fishline downwardly in such manner as to effect unseating of said hook-like end of the clip from said recess when the trailing end of said fishline becomes tensed.

6. A release mechanism for an expendable sinker comprising a weight having a substantially straight upper edge providing fore and aft lands divided by a gap formed between them in said straight upper edge, said weight having a groove formed in each of said lands in alignment with each other to receive a fishline and leader with their connecting swivel disposed in the gap formed between said lands, said weight having a notch formed in its leading edge at the level of the groove formed in said fore land providing a forwardly projecting nose portion adjacent said upper edge, a spring clip having a hooked fore end adapted to be hooked over said nose portion and have hinge-like engagement in said notch while bearing down upon the fishline, said weight having a recess formed in its trailing edge just below the level of the groove in said aft land thereof providing a hump-like corner between said aft land and said trailing edge, and a hook-like bend on the aft end of said spring clip adapted to having camming engagement with said hump-like corner and to seat in said recess when said clip is pressed against the upper edge of said weight.

7. A release mechanism for an expendable sinker comprising a weight having a substantially straight upper edge providing fore and aft lands divided by a gap formed between them in said edge, each of said lands having a groove formed therein in alignment with each other to receive a fishline and leader with their connecting swivel disposed in said gap, said weight having a notch formed in its leading edge at the level of the groove formed in said fore land providing a forwardly projecting nose portion adjacent said upper edge, a spring clip having a hooked fore end adapted to be hooked over said nose portion and have hinge-like engagement in said notch while bearing down upon the fishline, said weight having a recess formed in its trailing edge just below the level of the groove in said aft land thereof providing a hump-like corner between said aft land and said trailing edge, and a hook-like bend on the aft end of said spring clip adapted to have camming engagement with said hump-like corner and to seat in said recess when said clip is pressed against the upper edge of said weight, said hook-like bend bearing down upon the leader portion of the fishline extending rearwardly from said weight and being adapted to become unseated by said leader portion when the latter is pulled straight back relative to the aligned grooves formed in the fore and aft lands of said weight.

8. A release mechanism for an expendable sinker comprising a weight having an upper portion which is relatively flat on each side and provided with a straight upper surface having a groove formed therein to receive a fishline, said weight having a notch formed in its leading edge above the level of said groove to provide a nose portion at the juncture of said upper surface with said leading edge, a spring clip having a hooked fore end hooked over said nose portion and engageable in said notch to bear upon the fishline where it extends forwardly from said weight, said weight having a recess formed in its trailing edge at a level below said groove so that the fishline extending rearwardly from said groove curves downwardly over the trailing edge of said weight, and a hook-like aft end on said spring clip having slip fit seating in the recess in the trailing edge of said weight and bearing down upon that portion of the fishline extending therefrom so as to be unseated by the latter when said fishline becomes straightened out and tensed.

References Cited in the file of this patent

UNITED STATES PATENTS

| | | |
|---|---|---|
| 2,190,449 | Goldammer | Feb. 13, 1940 |
| 2,608,017 | Hinkson | Aug. 26, 1952 |
| 2,715,790 | Carpenter | Aug. 23, 1955 |